United States Patent [19]

Yano et al.

[11] 4,096,882
[45] Jun. 27, 1978

[54] CONTROL VALVE

[75] Inventors: Kazuhiko Yano; Kazuhiko Otsuki, both of Nishinomiya; Ryota Ohashi, Sakai, all of Japan

[73] Assignee: Kanzaki Kokyukoki Mfg. Co., Ltd., Amagasaki, Japan

[21] Appl. No.: 752,198

[22] Filed: Dec. 20, 1976

[30] Foreign Application Priority Data

Dec. 24, 1975 Japan .................. 50-155529
May 31, 1976 Japan .................. 51-63883
Jul. 8, 1976 Japan .................. 51-91567[U]

[51] Int. Cl.$^2$ ............................ F15B 13/06
[52] U.S. Cl. .................. 137/596.12; 91/446; 137/596; 137/625.24; 192/87.19; 192/103 FA; 192/109 F
[58] Field of Search ............... 91/446, 470; 137/596, 137/596.12, 625.24; 192/87.18, 87.19, 103 FA, 109 F

[56] References Cited

U.S. PATENT DOCUMENTS 3,752,281  8/1973  Arnold .................. 137/625.24 X

Primary Examiner—Gerald A. Michalsky

[57] ABSTRACT

A control valve having a rotor for communicating outlet port or ports selectively to fluid drain port or to inlet port so as to change flow direction of fluid to be supplied to fluid operated apparatus. The control valve comprises first and second pistons inserted in a hollow space of the rotor and a compression spring arranged between the pistons. At the operation position(s) of the rotor or the valve, the first piston which is biased by the compression spring oscillatingly blocks and reopens fluid passage formed within the rotor outside the first piston for communicating the inlet port to the outlet port(s) under the influence of the compression spring and fluid pressure of the outlet port(s) from which fluid is constantly drained with a small rate through the valve. Fluid pressure of the outlet port may be varied by varying the force of the compression spring by an advance of the second piston. Consequently, by controlling the advance of the second piston, fluid pressure of the outlet port(s), namely fluid pressure applied to the fluid operated apparatus may be controlled. The control valve thus functions not only as a change-over valve but as a valve for controlling fluid pressure applied to fluid operated apparatus.

11 Claims, 25 Drawing Figures

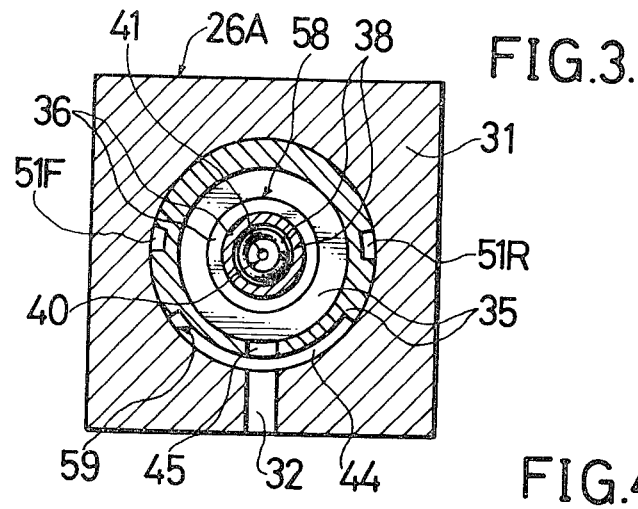
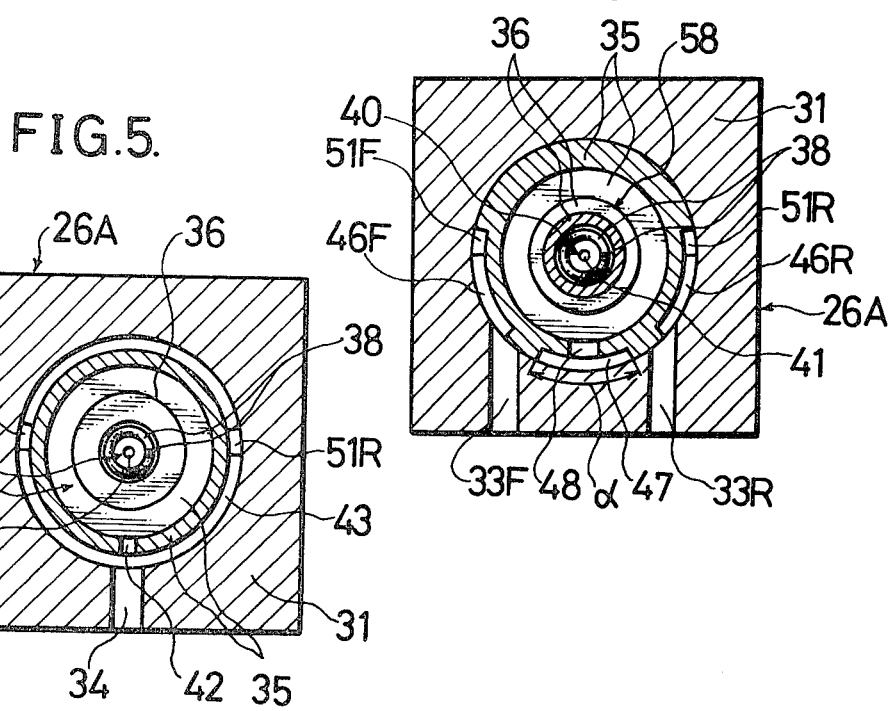

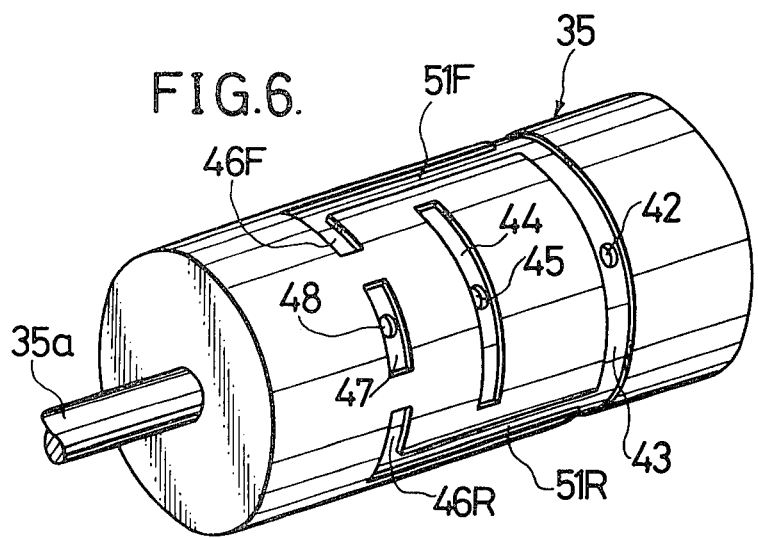
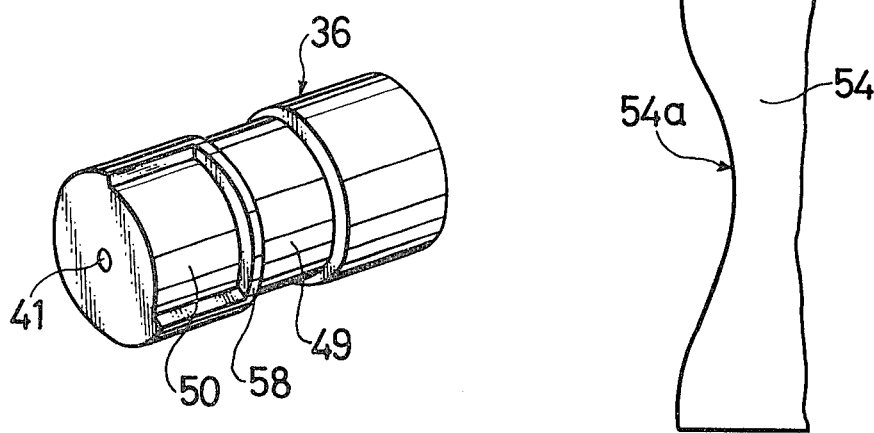

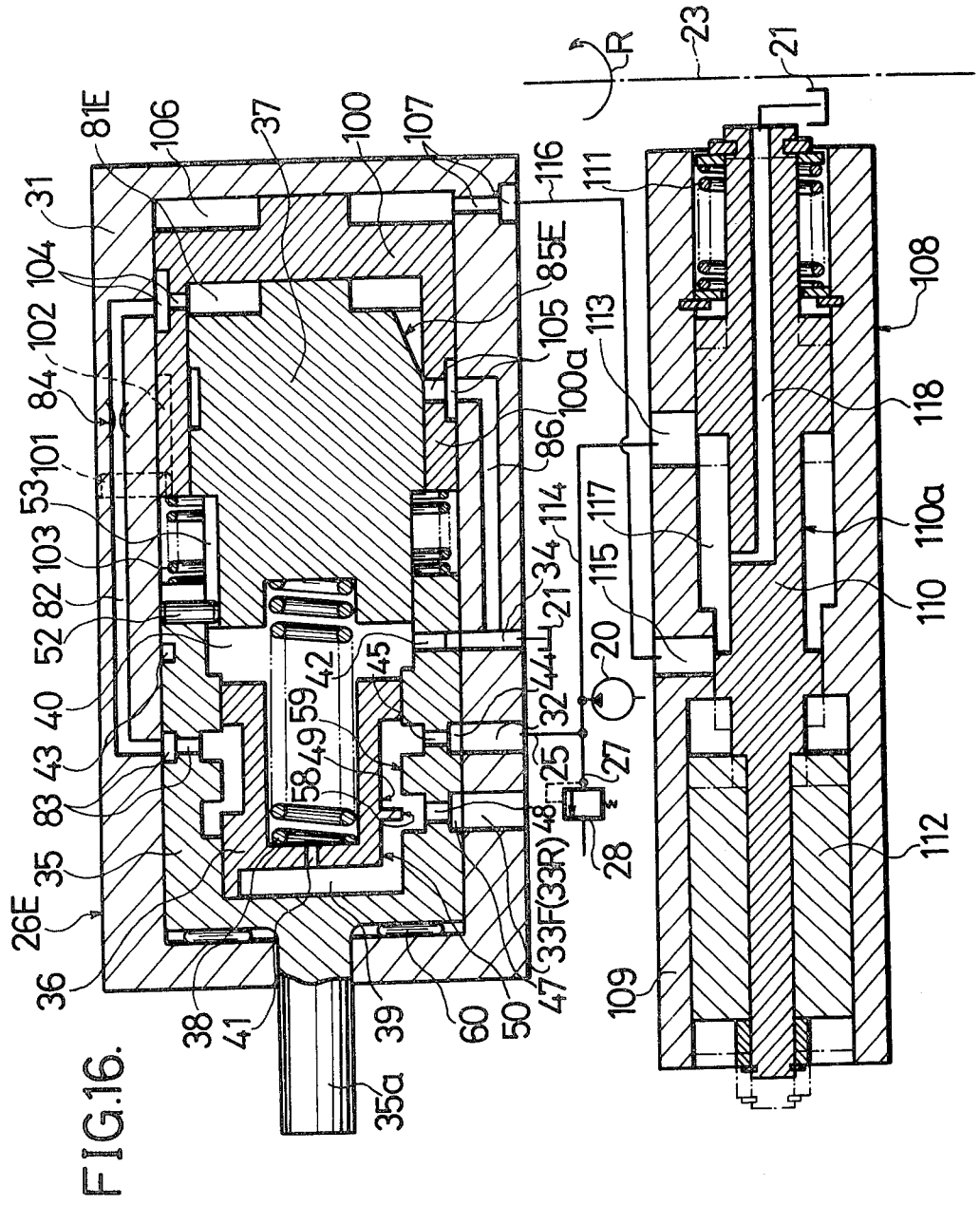

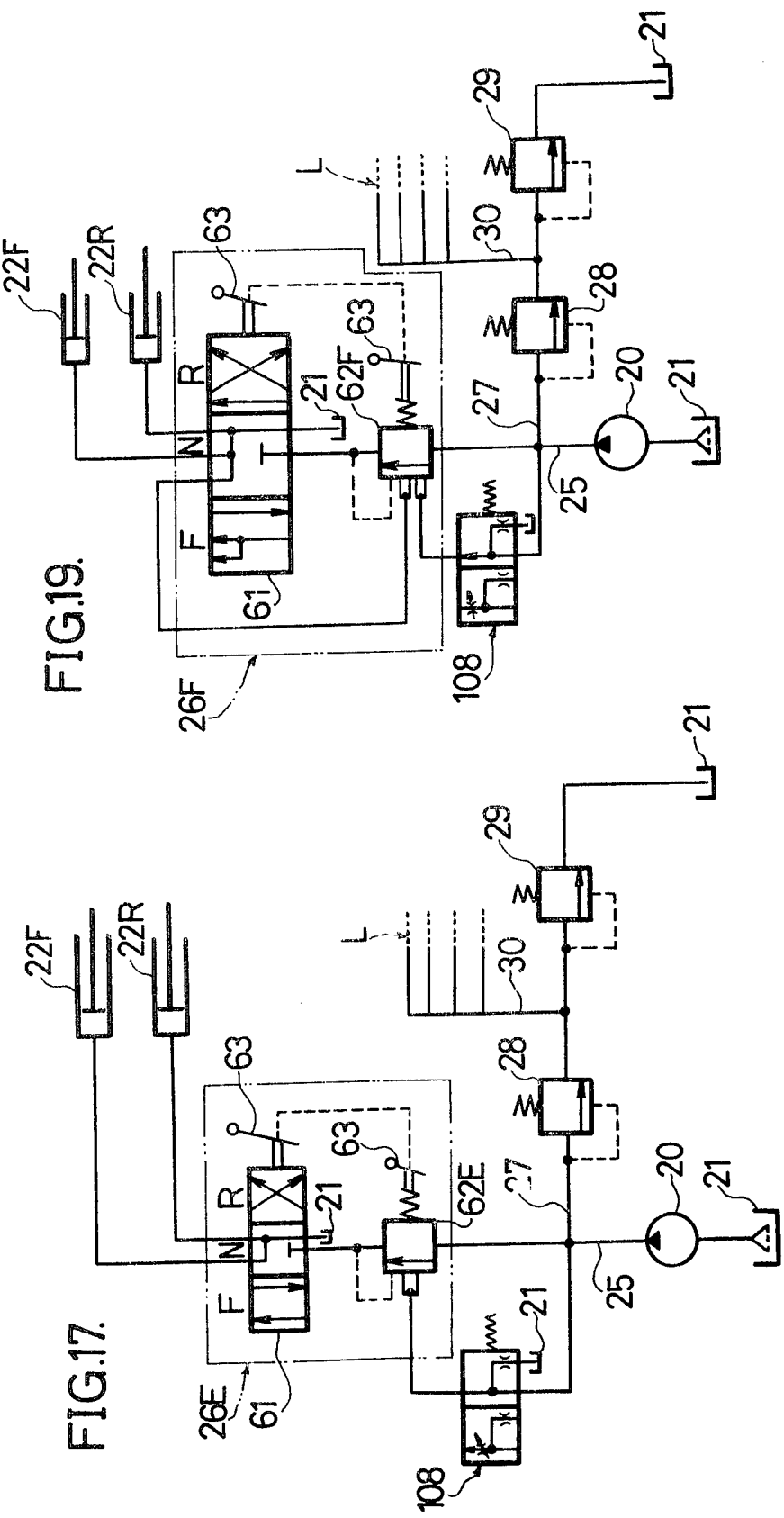

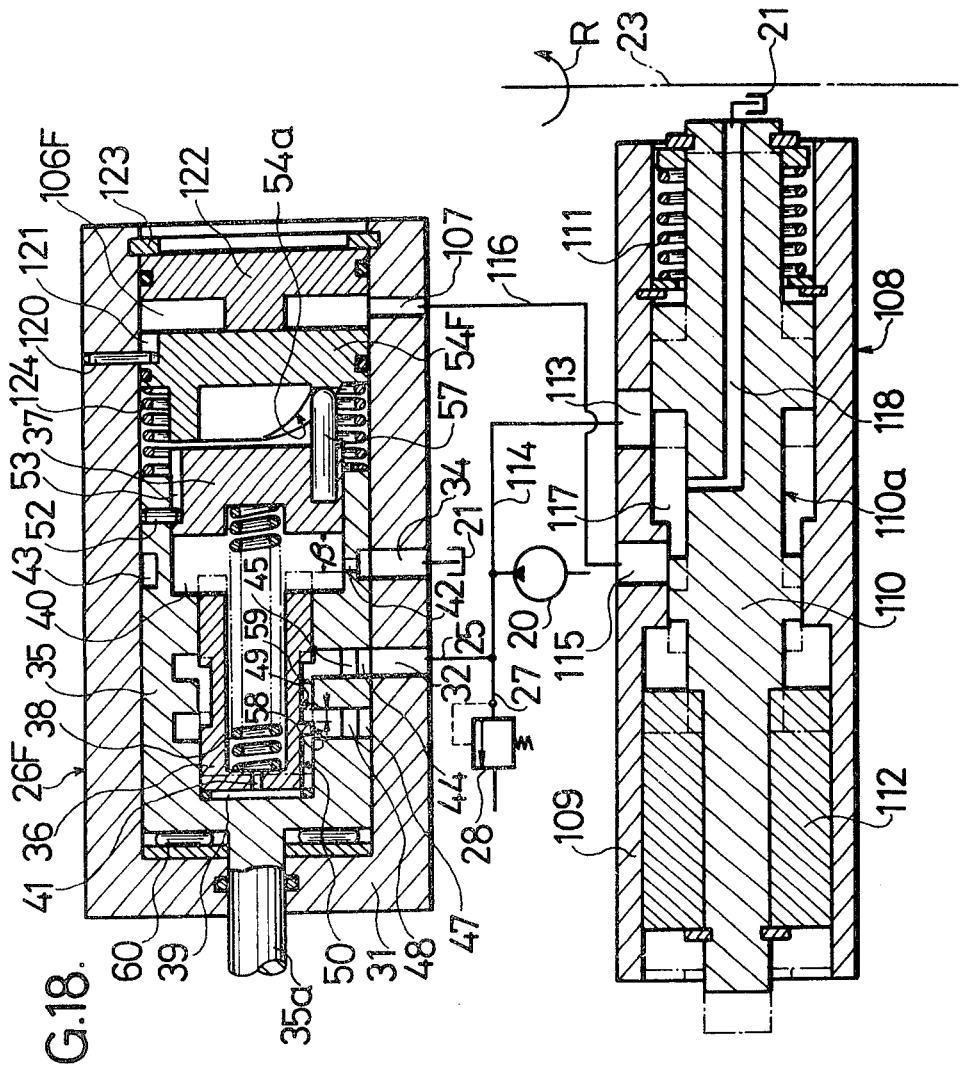

CONTROL VALVE

BACKGROUND AND SUMMARY

This invention relates to a novel and improved control valve means which is used in a fluid supply system for fluid operated means such as fluid operated clutch means. More particularly, the present invention relates to a control valve means comprising a valve case having an inlet port which is to be connected to a fluid pump, at least one outlet port which is to be connected to a fluid operated means, and a fluid drain port which is to be connected to a fluid tank; a rotor rotatably arranged in the valve case which rotor provides fluid passages for communicating the outlet port selectively to the fluid drain port at neutral position thereof or to the inlet port at operation position thereof; and a handling means for rotating the rotor selectively to one of the positions thereof and the present invention provides a novel control valve means of the mentioned type which functions not only as a valve for selectively changing flow direction of fluid but also as a valve for selectively reducing or lowering fluid pressure applied to fluid operated means at an operation position of the valve or the rotor thereof in a controlled manner.

Fluid operated clutch means employed in, by way of example, power transmission for the properller of a fishing boat is often required to be slippingly engaged so that the propeller is driven to rotate with a low speed. Such driving of propeller of a fishing boat with a low speed is required, for example, when the boat is fixed in position on sea for fishing operation against a tidal current and against the force of wind or when the boat is moved to follow fish in shoals moving with a low speed. For achieving such slippable engagement of fluid operated clutch means, the clutch means is applied by a fluid pressure much lower than normal fluid pressure which is applied to the clutch means for a full or non-slipping engagement of the clutch.

The conventional way for applying such low fluid pressure to a fluid operated clutch means is that fluid supply control circuit for such clutch means is provided with, besides a change-over or control valve for changing flow direction of fluid and a relief valve for determining or establishing normal fluid pressure applied to the clutch means for the full engagement thereof, a pressure-reducing valve which may cause a reduction of fluid pressure applied to the clutch means in a controlled manner. Such provision of a pressure-reducing valve, however, complicates the fluid supply control circuit for the clutch means. Further, because such pressure-reducing valve means is operated or controlled by a handling system other than a handling system for the change-over or control valve, such handling systems are also complicated especially when handling systems of a remote control type are employed. Such two kinds of handling systems which are often to be operated one after another further complicate operations thereof.

Similarly to fluid operated clutch means in power transmission for a fishing boat and the like, it is often required that one or a plurality of fluid operated means such as fluid operated clutch means, fluid operated cylinder unit or fluid operated motor employed in a tooling machine, earth-working machine or vehicle, tractor or the like is or are operated under various conditions by applying controlled fluid pressure of various values. In this case, there are also the mentioned problems.

Accordingly, a primary object of the present invention is to provide a novel control valve means which functions not only as a valve for selectively changing flow direction of fluid in a fluid supply system for fluid operated means but also as a valve for selectively varying or controlling fluid pressure applied to such fluid operated means.

Another object of the present invention is to provide a control valve means which functions not only as a change-over valve but as a pressure-reducing valve.

Still another object of the present invention is to provide a novel control valve means which functions not only as a change-over valve but as a valve for varying or controlling fluid pressure applied to fluid operated means and which is operated by a single handling system by which the valve may be operated not only to change flow direction of fluid but to vary or control fluid pressure applied to fluid operated means.

A further object of the present invention is to provide a control valve means which functions not only as a change-over valve but as a valve for varying or controlling fluid pressure applied to fluid operated means and which controls the output of the fluid operated means in cooperation with governor means.

The present invention and its attendant advantages will become more readily apparent as the specification is considered in conjunction with the accompanying drawings, in which:

FIG. 3 is a sectional view of the control valve means taken along line III—III of FIG. 2;

FIG. 4 is a sectional view of the control valve means taken along line IV—IV of FIG. 2;

FIG. 5 is a sectional view of the control valve means taken along line V—V of FIG. 2;

FIG. 6 is a perspective view of rotor employed in the control valve means shown in FIG. 2;

FIG. 7 is a perspective view of first piston employed in the control valve means shown in FIG. 2;

FIG. 8 is a developed view of a part of cam disk employed in the control valve means shown in FIG. 2;

FIG. 16 is a sectional view of a still further embodiment of the control valve means according to the present invention and a governor means which may be combined with such control valve means;

FIG. 17 is a schematic illustration of a fluid supply system similar to FIG. 1 but showing a use of the control valve means and governor means shown in FIG. 16;

FIG. 18 is a sectional view similar to FIG. 16 but showing another embodiment of the control valve means according to the present invention;

FIG. 19 is a schematic illustration of a fluid supply system similar to FIG. 17 but showing a use of the control valve means shown in FIG. 18;

Figure 1:
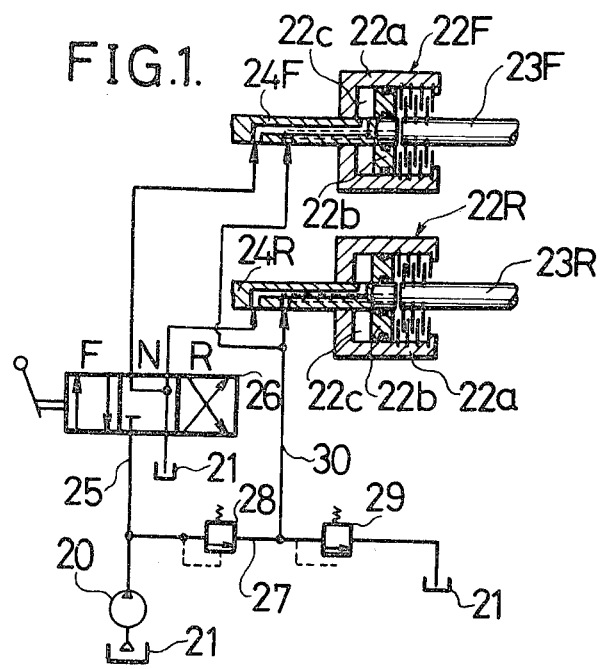
FIG. 1 is a schematic illustration of a fluid supply system for fluid operated clutch means in which the control valve means according to the present invention may be employed.

Referring now to the drawings in which like numerals designate like parts throughout the several views thereof, there is shown in FIG. 1 a fluid supply system for fluid operated means in which system the control valve means according to the present invention may be employed. The fluid supply system shown is constructed such that it supplies pressure fluid by a fluid pump 20 from a fluid tank 21 selectively to a fluid operated or actuated forward direction clutch 22F and a fluid operated or actuated backward direction clutch 22R. The fluid operated clutches 22 are of the conventional multi-disc friction type each having friction discs slidably but not rotatably mounted on a clutch housing 22a and other friction discs slidably but not rotatably mounted on a driven shaft 23F and 23R which discs are engaged to one another when a piston 22b within the housing 22a is advanced by fluid pressure applied to a fluid chamber 22c behind the piston resulting in operation of the clutch. The forward direction clutch 22F connects the driven shaft 23F, when operated, to a drive shaft 24F, which fixedly mounts the clutch housing, resulting in rotation of the driven shaft 23F toward positive direction and the backward direction clutch 22R connects the driven shaft 23R, when operated, to a drive shaft 24R, which fixedly mounts the clutch housing, resulting in rotation of the driven shaft 23R toward a negative direction. As shown in FIG. 1, fluid supply path or circuit 25 for the clutches is provided with a change-over or control valve 26 having three positions, namely a neutral position N in which the supply path 25 is blocked and fluid is drained from both of the clutches 22F and 22R, a forward direction or first operatin position F in which the supply path 25 is connected to the forward direction clutch 22F and fluid is drained from the backward direction clutch 22R, and a backward direction or second operation position R in which the supply path 25 is connected to the backward direction clutch 22R and fluid is drained from the forward direction clutch 22F. As also shown in FIG. 1, a fluid path or circuit 27 branched from the fluid supply path 25 is provided with a relief valve 28 for determining or establishing fluid pressure applied to the clutches and another relief valve 29 for determining or establishing fluid pressure for lubricant. From the path 27 is branched at between the relief valves 28 and 29 a lubricant supply circuit or path 30 which is then connected to the clutches 22F and 22R so that lubricant is supplied to the friction discs thereof. The transmission mechanism and fluid supply system shown in FIG. 1 are well known to the art.

One and another friction discs of each of the fluid operated clutches 22F and 22R are slippingly engaged when a fluid pressure much lower than that determined by the relief valve 28 is applied to the clutch. The clutch may thus establish a slippable connection between the drive shaft 24 and driven shaft 23, at which connection the driven shaft 23 is driven to rotate with a speed lower than the speed caused by the full engagement of the clutch. The present invention provides a novel control valve which may be employed in place of the mentioned control valve 26 so that a controlled fluid pressure lower than the pressure determined by the relief valve 28 may be applied selectively to the clutches 22F and 22R, while the function of the valve 26 is still maintained.

Referring to FIGS. 2 to 8, there is shown in these figures a preferred embodiment of the control valve means according to the present invention. As shown in FIGS. 2 to 5, the novel control valve designated by numeral 26A comprises a valve housing or case 31 having an inlet port 32 which is to be connected to the pump 20 or the outlet thereof, a pair of outlet ports 33F and 33R which are to be connected respectively to the fluid operated clutches 22F and 22R, and a fluid drain port 34 which is to be connected to the fluid tank 21. As also shown in FIGS. 2 to 5 said further in FIG. 6, the control valve 26A further comprises a rotor 35 which is rotatably arranged in the valve case 31 and which is rotated so as to change positions thereof by a handling means (not shown) connected to a shaft 35a of the rotor at outside the valve case. The rotor 35 is formed with fluid passages for selectively communicating the ports 32, 33 and 34 of the case 31, as detailed later. Through such fluid passages, both of the outlet ports 33F and 33R are communicated to the fluid drain port 34 at the neutral position N of the rotor or the valve 26A, the forward direction outlet port 33F is communicated to the inlet port 32 at the forward direction or first operation position F of the rotor or the valve 26A, while the backward direction outlet port 33R is communicated to the fluid drain port 34, and the backward directions outlet port 33R is communicated to the inlet port 32 at the backward direction or second operation position R of the rotor or the valve 26A, while the forward direction outlet port 33F is communicated to the fluid drain port 34.

Figure 2:
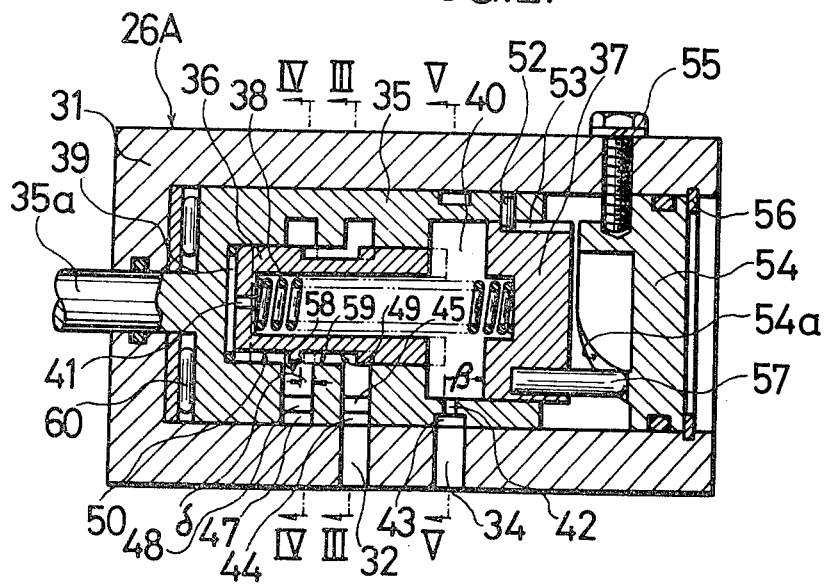
FIG. 2 is a longitudinal sectional view of an embodiment of the control valve means according to the present invention.

As clearly shown in FIG. 2, the rotor 35 is provided therein with a hollow space having an opened rear end. In such hollow space of the rotor are slidably inserted a first piston 36 and a second piston 37 which pistons are biased to move apart from each other by a compression spring 38 arranged therebetween. The first piston 36 defines a first fluid chamber 39 within the rotor 35 before the piston 36 and the second piston 37 defines a second fluid chamber 40 within the rotor 35 between the pistons 36 and 37, as shown in FIG. 2. The first and second fluid chambers 39 and 40 are communicated to each other by a narrow perforation or throttled fluid passage 41 perforated through the first piston 36 and the second fluid chamber 40 is communicated to the fluid drain port 34 by a perforation or fluid drain passage 42 perforated through the rotor 35 and an annular groove 43 formed to the periphery of the rotor 35 (see FIGS. 2, 5 and 6). In addition, the first piston 36 shown is formed into a hollow one having an opened rear end and the mentioned throttled fluid passage 41 is provided at the front end of the piston 36.

As shown in FIGS. 2, 3 and 6, the periphery of the rotor 35 is provided with a groove 44 facing to the inlet port 32 of the case 31 which groove has a width along the rotation direction of the rotor such that the groove 44 is constantly communicated to the inlet port 32 in whichever positions N, F and R the rotor 35 is positioned. The rotor 35 is further provided with a perforation or passage 45 which is faced to the inlet port 32 at the neutral position N of the rotor and which communicates the hollow space around the first piston 36 to the groove 44 and, therefore, to the inlet port 32. Further, as shown in FIGS. 2, 4 and 6, the periphery of the rotor 35 is provided, at a location along the axial direction of the valve where the outlet ports 33 are provided, with a pair of grooves 46F and 46R and a groove 47 which grooves are intermittently arranged along the direction of rotation of the rotor. The groove 46F is fashioned such that it constantly communicates to the forward direction outlet port 33F throughout a displacement or rotation of the rotor 35 between the neutral position N and the second operation position R of the rotor, whereas the groove 46R is fashioned such that it constantly communicates to the backward direction outlet port 33R throughout a displacement or rotation of the rotor 35 between the neutral position N and the first operation position F of the rotor. Further, the groove 47 which is located at between the grooves 46F and 46R is fashioned such that it is isolated or interrupted from the outlet ports 33F and 33R at the neutral position N of the rotor shown in FIG. 4 and such that it becomes communicated to the forward direction outlet port 33F when the rotor 35 is rotated from the neutral position N toward the first operation position F whereas it becomes communicated to the backward direction outlet port 33R when the rotor 35 is rotated from the neutral position N toward the second operation position R. This groove 47 is further fashioned such that it is communicated to an outlet port 33F or 33R during a rotation of the rotor 35 through an angle α shown in FIG. 4. At the center of the groove 47, the rotor 35 is provided with a perforation or passage 48 which opens to the hollow space within the rotor at outside the first piston 36. Furthermore, as shown in FIGS. 2, 5 and 6, the mentioned annular groove 43 provided to the periphery of the rotor 35 is located at a location along the axial direction of the valve where the fluid drain port 34 is provided.

As shown in FIGS. 2 and 7, the periphery of the first piston 36 is provided with an annular recess 49, which communicates the passage 45 to the passage 48 through the hollow space within the rotor at outside the piston 36 so that the groove 47, which becomes communicated to the outlet port 33F or 33R at the operation position F or R of the rotor 35, is communicated to the annular groove 44 which is constantly communicated to the inlet port 32. The first piston 36 thus defines a fluid passage for communicating the inlet port 32 to the outlet ports 33 within the hollow space at outside the first piston 36. As also shown in FIGS. 2 and 7, the periphery of the first piston 36 is further provided with a recess 50 having a width along the rotation direction of the rotor such that it communicates the passage 48 to the first fluid chamber 39 through the hollow space within the rotor at outside the piston 36 in whichever positions N, F and R the rotor 35 is positioned. Further, as shown in FIGS. 3 and 6, the periphery of the rotor 35 is provided with a pair of grooves or drain passages 51F and 51R extending along the axis of the rotor which passages constantly communicate the grooves 46F and 46R respectively to the annular groove 43.

At the neutral position N of the rotor 35 or control valve 26A, the forward direction outlet port 33F is communicated or connected to the fluid drain port 34 through the groove 46F, drain passage 51F and annular groove 43 and the backward direction outlet port 33R is communicated or connected to the fluid drain port 34 through the groove 46R, drain passage 51R and annular groove 43, as can be understood from the foregoing descriptions, so that fluid may be drained from the clutches 22F and 22R to the fluid tank 21. At this neutral position N, a part of fluid coming from the fluid pump 20 is also drained through the control valve 26A, namely through the inlet port 32, groove 44, passage 45, annular recess 49, recess 50, first fluid chamber 39, throttled passage 41, second fluid chamber 40, passage 42, annular groove 43 and fluid drain port 34. Almost all of the fluid coming from the fluid pump 20 is, however, forwarded or relieved toward the branched path 27 at this neutral position N because such drain path through the valve 26A includes the throttled passage 41. Flow of fluid at the operation positions F and R of the rotor 35 or the valve 26A will be described later after the construction of the valve 26A of this embodiment has fully be detailed.

The second piston 37 is fashioned such that it is advanced together with the rotation of the rotor 35 from the neutral position N toward the operation position F or R, as detailed hereinafter. As shown in FIG. 2, the second piston 37 is slidably but not rotatably connected to the rotor 35 by means of a pin 52 which is supported by the rotor and is received at the free end thereof by a groove 53 formed to the periphery of the piston 37 along the axis of such piston. The second piston 37 is thus rotated when the rotor 35 is rotated. In the valve case 30 is fixedly arranged, at behind the second piston 37, a cam disk 54 which is supported by the case 30 by means of a bolt 55 and a retaining ring 56. As clearly shown in FIG. 8, the front face of the cam disk 54 is formed into a cam face 54a gently sloped along the rotation direction and having a most retreated portion at the center to which cam face is engaged, as shown in FIG. 2, the free end of a pin 57 projected rearwardly from the second piston 37. At the neutral position N of the rotor 35, the pin 57 engages to the cam face 54a at the most retreated portion of the face so that, when the second piston 37 is rotated together with the rotation of the rotor 35 from the neutral position N toward an operation position F or R, the piston 37 is gradually advanced due to the following or tracing of the cam face 54a by the free end of the pin 57. Meanwhile, the cam face 54a is shaped such that, when the rotor 35 has been rotated almost fully from the neutral position N toward an operation position F or R, the second piston 37 is advanced by a distance β shown in FIG. 2 so that the piston 37 blocks the aforementioned drain passage or perforation 42. It is thus seen that the second piston 37 is fashioned such that it blocks, when the rotor 35 has been rotated almost fully toward an operation position, the passage 42 for communicating the second fluid chamber 40 to the fluid drain port 34, and, until such blocking of the passage 42, it compresses the aforementioned compression spring 38 in correspondence with the advanced distance of the piston 37 so that force or pressure caused by the spring 38 is enlarged correspondingly.

The first piston 36 is fashioned as follows: As shown in FIGS. 2 and 7, the periphery of such first piston 36 is provided at between the mentioned recesses 49 and 50 a blocking portion or land 58 having a large diameter which is engaged onto or registered with, when the piston 36 has been retreated by a small distance δ shown in FIG. 2, the inner periphery 59 of the rotor in a fluid-tight manner so that fluid path formed by the annular recess 49 for communicating the inlet port 32 to an outlet port 33 at an operation position of the rotor becomes blocked by such blocking portion 58. In FIG. 2, numeral 60 designates thrust bearing means arranged in the valve case before the rotor 35.

The control valve 26A operates as follows: When the rotor 15 is rotated from the neutral position N, in which fluid flows in the manner detailed before, toward the first operation position F to cause communication of the groove 47 to the forward direction outlet port 33F, pressure fluid supplied from the pump 20 to the valve 26A flows through the inlet port 32, groove 44, passage or perforation 45, annular recess 49, passage or perforation 48, groove 47 and forward direction outlet port 33F so that such pressure fluid is supplied to the forward direction clutch 22F. At the same time, pressure fluid from the inlet port 32 flows from the annular recess 49 via the recess 50 into the first fluid chamber 39 and then flows from here into the second fluid chamber 40 through the throttled passage 41 with a relatively small rate and is drained into the tank 21 through the drain passage 42, annular groove 43 and fluid drain port 34. Meanwhile, as the fluid chamber 22c of the clutch 22F is filled with such fluid, fluid pressure in the first fluid chamber 39 rises so that such pressure in the chamber 39 becomes larger than fluid pressure in the second fluid chamber 40 from which fluid is constantly drained. Consequently, the first piston 36 becomes retreated against the force of the spring 38 after a time from the rotation of the rotor and, when the piston 36 has been retreated by the mentioned distance δ, the blocking portion 58 of the piston 36 reaches the face 59 so that communication between the inlet port 32 and outlet port 33F becomes interrupted. Even after such interruption of communication between the ports 32 and 33F, draining of fluid from the outlet port 33F is, however, constantly continued through the recess 50, first fluid chamber 39, throttled passage 41, second fluid chamber 40, drain passage 42, annular groove 43 and fluid drain port 34 and also some fluid drain port 34 and also some fluid leaks at the clutch 22F. Consequently, fluid pressure in the first fluid chamber 39 communicated to the outlet port 33F becomes lowered so that the first piston 36 is advanced a little by the force of the spring 38, whereby the inlet port 32 becomes communicated again to the forward direction outlet port 33F. Thereafter, the above operation is repeated. In this state, the backward direction outlet port 33R is constantly communicated to the fluid drain port 34 through the groove 46R, drain passage 51R and annular groove 43, as is the case of the neutral position N of the rotor 35.

So far as the perforation or drain passage 42 for communicating the second fluid chamber 40 to the fluid drain port 34 is not blocked by the second piston 37, the control valve 26A operates as detailed hereinbefore. In this operation state of the valve 26A, the first piston 36 is oscillated forwardly and rearwardly along the axial direction of the valve by a small distance or amplitude with keeping a fluid pressure at the forward direction outlet port 33F which pressure is determined by the force or pressure caused by the compression spring 38 which has somewhat been compressed in comparison to the neutral state of the valve in correspondence to the advanced distance of the second piston 37. Such advanced distance of the piston 37 corresponds to the angle of rotation by which the rotor 35 has been rotated. The compression spring 38 is fashioned such that such fluid pressure at the outlet port established in the non-blocking state of the drain passage 42 for communicating the chamber 40 to the drain port 34 is much lower than the fluid pressure established by the relief valve 28. Accordingly, a slippable operation of the fluid operated clutch 22F may be carried out by applying such low fluid pressure to the clutch 22F. Because such low fluid pressure corresponds to the compressed degree of the spring 38 by the second piston 37 which is advanced by a distance corresponding to the rotated angle of the rotor 35, such pressure may be varied or controlled by the control of angle of rotation of the rotor 35 to an optional one from the pressure nearly corresponding to the force of the spring 38 at the neutral state and to the pressure corresponding to the force of the spring 38 at a state where the second piston 37 is positioned immediately behind the perforation or drain passage 42.

Contrarily, when the rotor 35 is almost fully rotated toward the first operation position F so that the perforation or drain passage 42 for communicating the second fluid chamber 40 to the fluid drain port 34 has been blocked by the second piston 37, fluid pressure in the second fluid chamber 40 becomes equal to that in the first fluid chamber 39 because of the interruption of fluid draining from the chamber 40 so that the first piston 36 becomes advanced to its most advanced position by the force of the spring 38, whereby fluid pressure determined by the relief valve 28 is applied to the forward direction clutch 22F resulting in full or non-slippable engagement of the clutch 22F.

In the event when the control valve 26A or the rotor 35 thereof is displaced from the neutral position N toward the second operation position R, an operation similar to the operation detailed hereinbefore is attained. When the control valve 26A or the rotor 35 thereof is returned from an operation position F or R to the neutral position N, the outlet ports 33 are communicated to the fluid drain port 34 through the mentioned path and the second piston 37 is retreated by the force of the spring 38 thereby blocking of the passage 42 being released.

Figure 9:
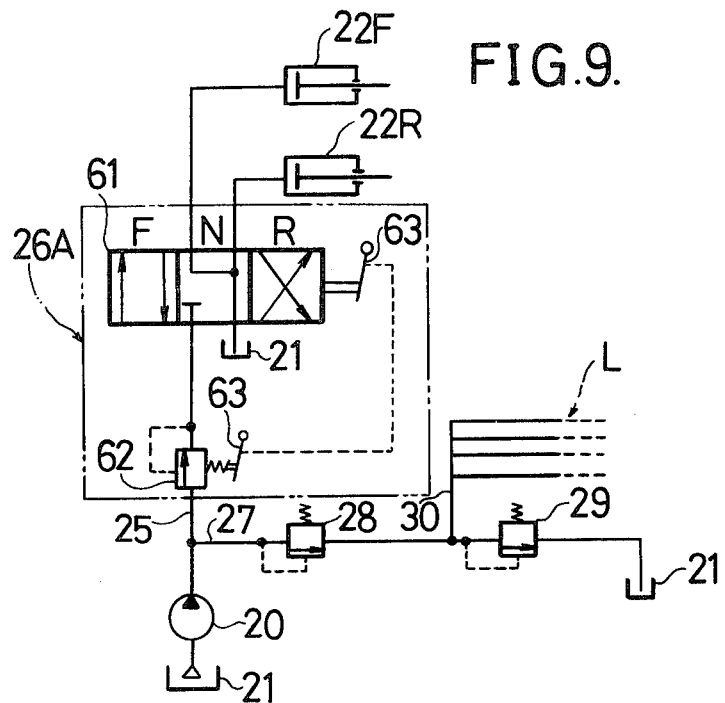
FIG. 9 is a schematic illustration of a fluid supply system similar to FIG. 1 but showing a use of the control valve means shown in FIGS. 2 to 8.
Figure 10:
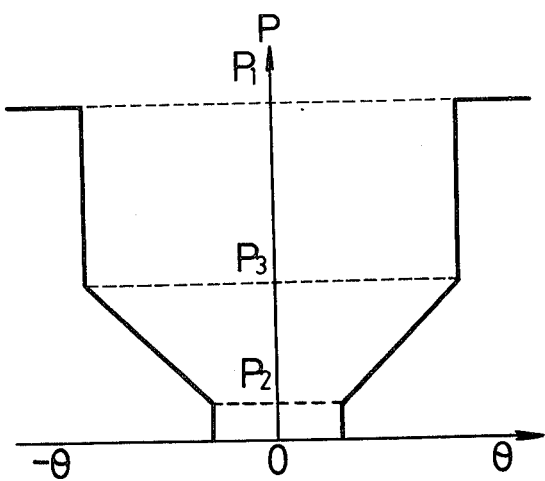
FIG. 10 is a schematic illustration showing operation of the control valve means shown in FIGS. 2 to 8.

As can now be understood with ease, a fluid supply system which is similar to the one shown in FIG. 1 but in which the control valve 26A shown in FIGS. 2 to 8 is employed in place of the valve 26 shown in FIG. 1 may be illustrated as shown in FIG. 9 in which the fluid operated clutches 22F and 22R are illustrated as cylinder units and members L to be lubricated are illustrated schematically for simplicity. The valve 26A has a valve mechanism 61 for changing flow direction of fluid and a valve mechanism 62 for reducing fluid pressure applied to the fluid operated means 22 which mechanisms are operated by a common handling means or lever 63. Further, the relation between the angle of rotation $\theta$ of the rotor 35 and fluid pressure P applied to the fluid operated clutches 22F and 22R may be illustrated as shown in FIG. 10. As shown in FIG. 10, a low fluid pressure between $P_2$ and $P_3$, for example between 1.5 kg/cm$^2$ and 2.5 kg/cm$^2$, which is much lower than the normal fluid pressure $P_1$ of, for example, 10 to 15 kg/cm$^2$ determined by the relief valve 28 may selectively be applied to each of the clutches 22F and 22R so that speed of rotation of each of the driven shafts 23F and 23R may be varied or controlled. Further, in a case where a frequent change in the direction of driving with a low speed is required, as is the case of, by way of example, a fishing boat which must follow a movement of fish in shoals, such frequent change may be achieved only by handling the control valve 26A or the rotor 35 thereof.

Figure 11:
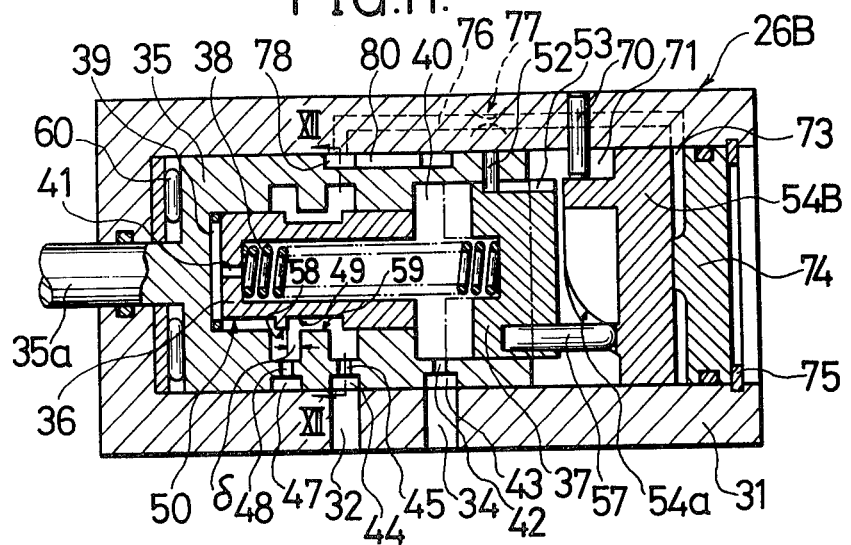
FIG. 11 is a sectional view similar to FIG. 2 but showing another embodiment of the control valve means according to the present invention.
Figure 12:
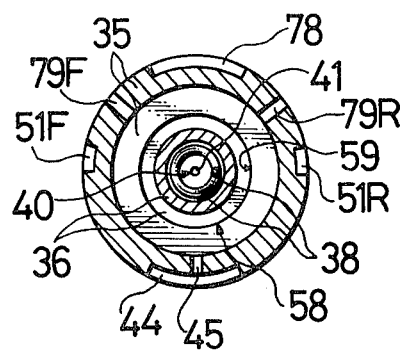
FIG. 12 is a sectional view of rotor and first piston employed in the control valve means shown in FIG. 11 taken along line XII—XII of FIG. 11.

Turning to a consideration of FIGS. 11 and 12, there is shown in these figures another embodiment of the control valve means according to the present invention. In the control valve 26B of this embodiment, a care is taken for preventing a shock applied to the fluid operated clutches 22F and 22R which shock may be caused when the rotor 35 in the control valve 26A shown in FIGS. 2 to 8 is rapidly rotated from the neutral position N fully toward an operation position F or R resulting in a rapid or immediate blocking of the drain passage 42 so that a high fluid pressure determined by the relief valve 28 is rapidly applied to the clutch. As shown in FIG. 11, a cam disk 54B similar to the cam disk 54 employed in the valve 26A shown in FIGS. 2 to 8 is slidably but not rotatably connected to the valve case 31 by means of a pin 70 which is fixedly supported by the case 31 and is received at the free end thereof by a groove 71 formed to the periphery of the disk 54B along the axial direction of the valve. The cam face 54a of this cam disk 54B is particularly fashioned such that, even when the second piston 37 is advanced to the most advanced position shown in FIG. 11 with imagined line by a full rotation of the rotor 35 toward an operation position F or R at a state where the cam disk 54B is positioned at the most retreated position shown, the drain perforation or passage 42 for communicating the second fluid chamber 40 to the fluid drain port 34 is not blocked by the piston 37. Behind such cam disk 54B is formed, within the valve case, another fluid chamber 73 the behind of which is defined by a disk 74 fixed in position by a retaining ring 75. To the fluid chamber 73 is opened a fluid passage 76 perforated through the valve case which passage has a throttle or orifice 77 therein. The other open end of the fluid passage 76 is selectively faced in accordance with the position of the rotor 35 to a groove 78 formed to the periphery of the rotor at the neutral position N of the rotor or to any one of perforations or passages 79F and 79R for communicating the passage 76 to the hollow space within the rotor at outside the first piston 36 at the fully rotated state of the rotor toward the operation position F or R, as canbe seen from FIG. 12. The goove 78 is communicated to the annular groove 43 through a groove 80 formed in the periphery of the rotor along the axial direction of the valve. The other parts of the valve 26B shown in FIGS. 11 and 12 are constructed similarly to the ones of the valve 26A shown in FIGS. 2 to 8. Needless to say, a selected low fluid pressure lower than the fluid pressure determined by the relief valve 28 may also be applied to fluid operated means such as fluid operated clutch means by employing this control valve 26B in the fluid supply system for such means. In addition to this, even when the rotor 35 of this control valve 26B is rapidly rotated fully toward an operation position F or R from the neutral position N shown in FIG. 11, the drain passage 42 is not blocked by such rotation of the rotor itself. After such full rotation of the rotor 35 toward an operation position, the cam disk 54B is gradually advanced by pressure fluid supplied to the fluid chamber 73 from the inlet port 32 through the groove 44, passage 45, the hollow space within the rotor 35, perforation or passage 79F or 79R and passage 76 and through the throttle 77. By such gradual advance of the cam disk 54B, the second piston 37 is gradually advanced resulting in a gradual blocking of the drain passage 42 by such piston 37 so that a rapid application of a high fluid pressure to fluid operated means 22F or 22R is prevented, that contributes to prevent a damage or the like of the fluid operated means and transmission members associated therewith which damage may be caused by a shock due to such rapid application of a high fluid pressure. When the valve 26B or the rotor 35 thereof is returned to its neutral position N, fluid in the fluid chamber 73 is drained toward the tank 21 through the passage 76, groove 78, groove 80, annular groove 43 and fluid drain port 34 so that the cam disk 54B is returned to its original position together with the second piston 37 by the force of the spring 38. It is preferred that, although not shown in the drawings, the passage 76 is provided with a bypass in which a check valve arranged in parallel to the throttle 77 and permitting flow of fluid only toward the groove 78 or drain port 34 is inserted. In this case, a rapid draining of fluid from the fluid chamber 73 is attained through such bypass or check valve when the valve 26B or the rotor 35 thereof is returned to the neutral position N so that a rapid return of the valve to the neutral state may be achieved.

Figure 13:
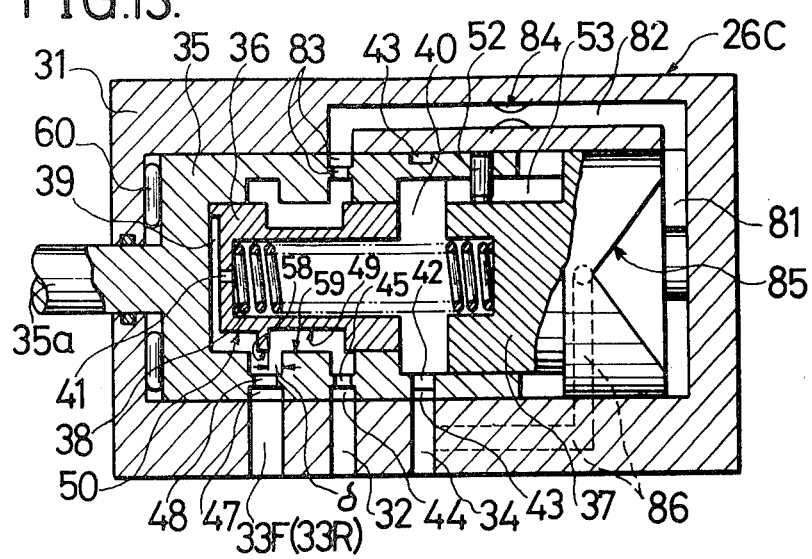
FIG. 13 is a sectional view similar to FIG. 2 but showing still another embodiment of the control valve means according to the present invention.

Although means for advancing the second piston 37 in response to the rotation of the rotor 35 is fashioned, in the embodiments shown in FIGS. 2 to 8 and in FIGS. 11 and 12, such that it comprises cam means for causing the advance of the second piston, such piston 37 may be advanced in response to the rotation of the rotor 35 not only by another mechanical means causing a simultaneous advance of the piston 37 with the rotation of the rotor but also by fluid pressure. FIG. 13 shows still another embodiment of the control valve means 26C according to the present invention in which embodiment the second piston is advanced by fluid pressure.

As shown in FIG. 13 in which the valve 26C is illustrated in a state where the rotor has just been rotated toward an operation position, a fluid chamber 81 is formed within the valve case 31 behind the second piston 37 which is slidably but not rotatably connected to the rotor 35. This fluid chamber 81 is communicated via a passage 82 perforated through the valve case and via a perforation or passage 83 perforated through the rotor 35 to the hollow space within the rotor at outside the first piston 36 which space is in constant communication with the inlet port 32, as detailed before. The passage 82 has a throttle or oriffice 84 inserted therein for reducing flow rate through such passage 82. To the rear face of the second piston 37 is formed a sloped recess 85 having a shape such that it is narrowed toward the foward end. The valve case 31 is further formed with a drain passage 86 opened at one end to the fluid chamber 81 at the recess 85 for communicating the chamber 81 to the fluid drain port 34. The recess 85 is fashioned or shaped such that it opens to the passage 86 at the neutral position N of the rotor 35, where the second piston 37 is positioned at the most retreated position shown in FIG. 13, and is once blocked or interrupted from the passage 86 by a rotation of the second piston caused by a rotation of the rotor toward an operation position F or R due to a displacement of such recess 85 which is caused by such rotation of the second piston 37. The recess 85 is then reopened to the passage 86 when the second piston 37 has been advanced by a distance corresponding to the rotated angle of the rotor 35. The recess 85 is further fashioned or shaped such that it is disconnected from the drain passage 86 at the fully rotated state of the piston 37 toward the operation position of the rotor and at the most advanced state of the piston 37. The other parts of the valve 26C shown in FIG. 13 are constructed similarly to the ones of the valve 26A shown in FIGS. 2 to 8.

Figure 14:
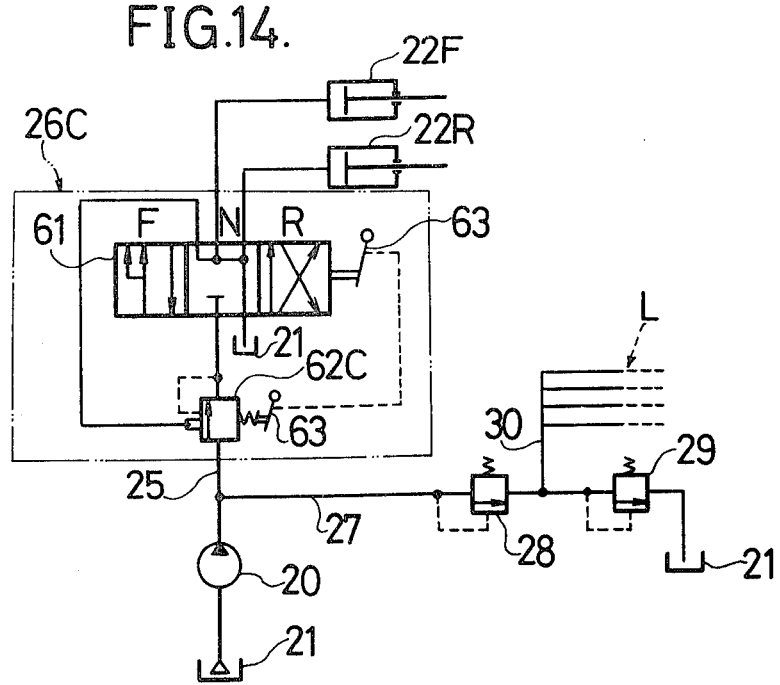
FIG. 14 is a schematic illustration of a fluid supply system similar to FIG. 1 but showing a use of the control valve means shown in FIG. 13.

In the control valve 26C shown in FIG. 13, when the rotor 35 is rotated toward an operation position F or R, the communication between the fluid chamber 81 and the fluid drain port 34 is once interrupted by a displacement of the recess 85 which displacement is caused by a rotation of the second piston 37 together with the rotation of the rotor 35. To the fluid chamber 81 is then supplied pressure fluid from the inlet port 32 gradually through the throttle 84 so that the second piston 37 is gradually advanced. When the piston 37 has been advanced by a distance corresponding to the rotated angle of the rotor and second piston, the recess 85 becomes communicated again to the drain passage 86 so that the advance of the second piston 37 is stopped. The spring 38 is thus compressed in correspondence with the advanced of the second piston. When the rotor 35 is rotated fully toward an operation position F or R, the second piston 37 is rotated to a position in which the fluid chamber 81 is not communicated to the fluid drain port 34. As can be understood now, a fluid supply system which is similar to the one shown in FIG. 1 but in which the control valve 26C shown in FIG. 13 is employed in place of the valve 26 shown in FIG. 1 may be illustrated as shown in FIG. 14 in which the fluid operated clutches 22F and 22R are illustrated as cylinder units and members L to be lubricated are schematically illustrated for simplicity. The fluid supply system shown in FIG. 14 in which the valve mechanism for reducing fluid pressure is designated by 62C operates similarly to the one shown in FIG. 9. In addition, the valve 26C is fashioned such that the fluid chamber 81 is communicated to the inlet port 32 at least at each of the operation positions of the rotor 35.

Figure 15:
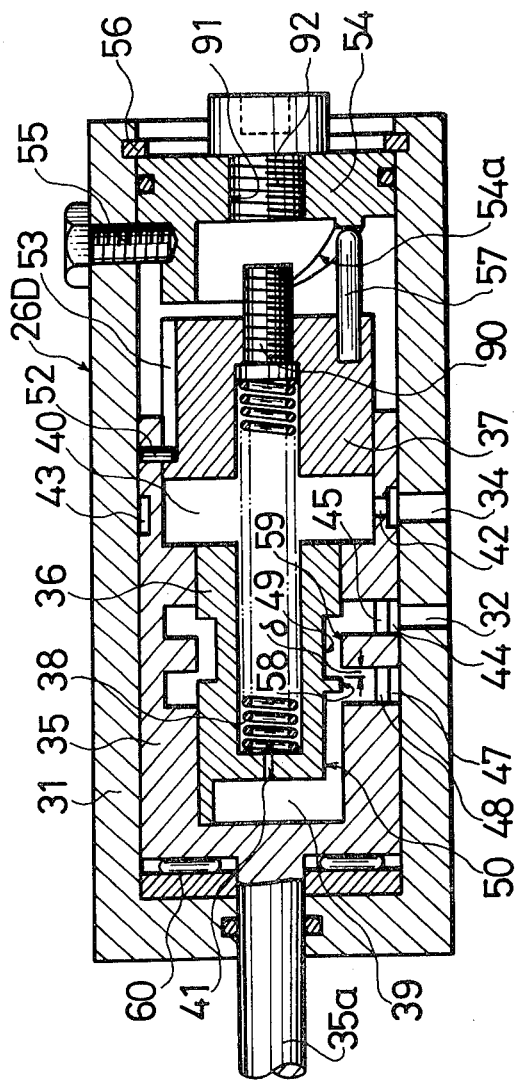
FIG. 15 is a sectional view similar to FIG. 2 but showing a further embodiment of the control valve means according to the present invention.

Turning to a consideration of FIG. 15, there is shown in this figure a further control valve 26D according to the present invention in which valve the original force or pressure of the mentioned compression spring 38 may be varied or controlled. As shown in FIG. 15, the rear end of the spring 38 is received by a bolt 90 which is supported by the second piston 37 so that it may be advanced and retreated by a manual rotation thereof. To the cam disk 54 is provided an opening 91 which is closed by a plug 92. The original force or pressure of the spring 38 may be varied in accordance with a range of pressure to be caused by such spring by rotating the bolt 90 so as to displace such bolt along the axial direction of the valve at a state in which the plug 92 is removed. The other parts of the control valve 26D shown in FIG. 15 are constructed similarly to the ones of the control valve 26A shown in FIGS. 2 to 8.

Referring to FIG. 16, there is shown in this figure a still further embodiment of the control valve means according to the present invention. The control valve 26E shown in FIG. 16 is constructed similarly to the control valve 26C shown in FIG. 13 but is slightly changed as follows: Within the valve case 31 is slidably arranged behind the second piston 37 a control piston 100 having a hollow extension 100a into which the rear end portion of the second piston 37 is slidably inserted, as shown in FIG. 16. The control piston 100 to which the second piston 37 is constantly engaged by the force of the spring 38 is slidably but not rotatably connected to the valve case 31 by means of a pin 101 which is supported by the case and is inserted at the free end thereof into a groove 102 formed to the extension 100a along the axial direction of the valve. Further, the control piston 100 is biased rearwardly by a spring 103 arranged between the extension 100a thereof and the rotor 35. Between the second piston 37 and the control piston 100 is formed a fluid chamber 81E which corresponds to the fluid chamber 81 of the control valve 26C shown in FIG. 13. Supply of pressure fluid to such fluid chamber 81E from the inlet port 32 is made through the groove 44, passage 45, hollow space within the rotor 35, passage 83 and passage 82 having a throttle or orifice 84 therein, as is the case of the control valve 26C shown in FIG. 13, and through a passage 104 formed through the control piston 100. Selective drainage of fluid from the chamber 81E is made through a recess 85E, which corresponds to the recess 85 of the control valve 26C shown in FIG. 13, and a fluid passage 105 provided to the control piston 100 and through a passage 86 similar to the passage 86 of the control valve 26C. Within the valve case 31 of the control valve 26E shown in FIG. 16 is particularly formed, at behind the control piston 100, another fluid chamber 106 to which another port 107 provided to the valve case 31 is opened.

The control valve 26E of this embodiment is fashioned such that it is used in combination with governor means 108 shown in FIG. 16. Such governor means 108 comprises a casing 109 which is driven to rotate by the mentioned driven shaft 23 (FIG. 1) round the axis of such shaft as indicated by arrow R in FIG. 16. Within the casing 109 is slidably inserted a slider 110 which is biased by a spring 111 toward the right of FIG. 16. A governor weight 112 is mounted on the slider 110 at within the casing in a fashion such that the slider is moved to slide together with the weight. The casing 109 is provided with an inlet port 113, which is to be connected to the fluid pump 20 by a path 114, and an outlet port 115 which is to be connected to the port 107 of the valve 81E by another path 116. The slider 110 has a part 110a having a reduced diameter by which part a communication path 117 for communicating the inlet port 113 to the outlet port 115 is formed within the casing 109. A narrow drain passage 118 perforated through the slider 110 is opened to such path 117. The governor weight 112 is moved toward the left of FIG. 16 against the force of the spring 111 by a centrifugal force caused by the rotation of the casing 109 around the shaft 23 so that, when the shaft 23 is rotated by an engagement of the clutch, the slider 110 is moved to the left of FIG. 16. The position of the slider 110 is determined by the centrifugal force caused and, therefore, by the speed of rotation of the shaft 23. The governor means 108 is fashioned such that, at a predetermined speed of rotation of the shaft 23, the slider 110 is just positioned at the position shown by imagined line where the slider 110 just blocks the inlet port 113.

It is thus seen that, when the speed of rotation of the driven shaft 23 is lower than the predetermined one, pressure fluid is supplied from the fluid pump 20 to the fluid chamber 106 of the control valve 26E through the path 114, through the governor means 108, namely through the inlet port 113, communication path 117 and outlet port 115, and through the path 116 so that the control piston 100 is slightly advanced to cause an advance of the second piston 37. This advance of the piston 37 will cause a further compression of the spring 38 resulting in a rise in fluid pressure applied to the clutch 22 under operation. Consequently, the force of engagement of the clutch is somewhat enlarged resulting in a rise in the speed of rotation of the shaft 23. When such speed of rotation of the shaft 23 exceeds the predetermined value, fluid is drained from the fluid chamber 106 toward the tank 21 through the path 116, outlet port 115 of the governor, communication path 117 in the governor and drain passage 118 so that the control piston 100 is slightly retreated resulting in a retreatment of the second piston 37. This retreatment of the piston 37 results in a reduction of the force or pressure caused by the spring 38 so that flud pressure applied to the clutch 22 under operation is somewhat reduced. Consequently, the speed of rotation of the shaft 23 is somewhat lowered. By repeating such operation, the control valve 26E shown in FIG. 16 controls, in cooperation with the governor means 108, the speed of rotation of the shaft to the predetermined one. The fluid supply system in which the control valve 26E and governor means 108 shown in FIG. 16 are employed may be illustrated as shown in FIG. 17 in which the valve mechanism for reducing fluid pressure is designated by 62E.

In FIG. 18, there is shown another control valve 26F according to the present invention which valve is also suitable for use in combination with a governor. This control valve 26F is constructed similarly to the control valve 26A shown in FIGS. 2 to 8 but is slightly changed as follows: As shown in FIG. 18, cam disk 54F which coresponds to the cam disk 54 shown in FIG. 2 is slidably but not rotatably connected to the valve case 31 by means of a pin 120 which is supported by the case and is inserted at the free end thereof into a groove 121 formed to the periphery of the disk 54F. Within the valve case 31 is formed behind the cam disk 54F a fluid chamber 106F, which corresponds to the fluid chamber 106 shown in FIG. 16, by a disk 122 which is fixed in position within the case 31 by a retaining ring 123. The second piston 37 is constantly engaged to the cam disk 54F through the cam follower or pin 57 by the force of the spring 38, as is the case of the piston 37 shown in FIG. 2. The cam disk 54F is biased rearwardly by a spring 124 arranged between the rotor 35 and this cam disk. The valve case 31 is provided with another port 107 which is opened to the fluid chamber 106F, as is the case of the valve 26E shown in FIG. 16.

As shown in FIG. 18, the control valve 26F is used in combination with governor means 108 having a same construction with that of the governor means 108 shown in FIG. 16. This control mechanism operates similarly to the one shown in FIG. 16 and may be illustrated as shown in FIG. 19 in which the valve mechanism for reducing fluid pressure is designated by 62F.

Figure 20:
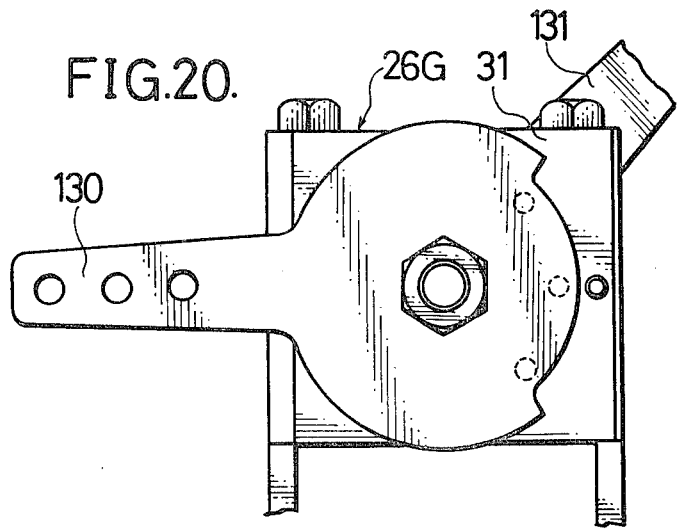
FIG. 20 is a front elevational view, partially cut away, of still another embodiment of the control valve means according to the present invention.
Figure 21:
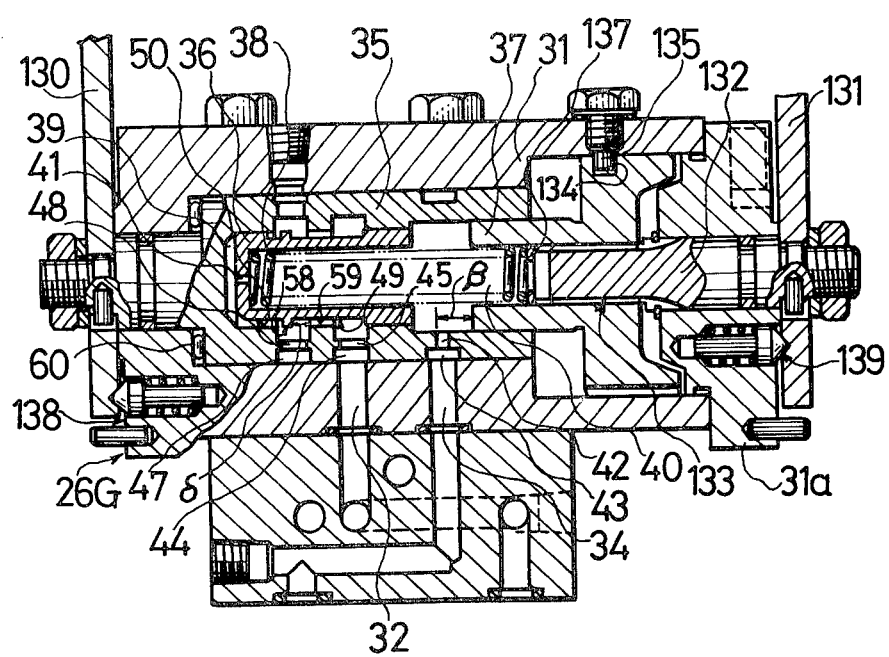
FIG. 21 is a longitudinal sectional view of the control valve means shown in FIG. 20.
Figure 22:
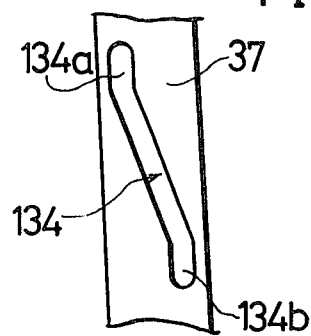
FIG. 22 is a developed view of a part of second piston employed in the control valve means shown in FIGS. 20 and 21.

Although each of the control valves 26A, 26B, 26C, 26D, 26E and 26F detailed hereinbefore is fashioned such that the second piston 37 is advanced automatically in response to the rotation of the rotor 35, such second piston 37 may be advanced independently from the rotation of the rotor 35. In FIGS. 20 to 22, there is shown an embodiment of the control valve means according to the present invention in which the second piston 37 is advanced independently from the rotation of the rotor 35.

In the control valve 26G shown in FIGS. 20 to 22, there is provided no mechanism for simultaneously rotating the second piston 37 in response to the rotation of the rotor 35 which is rotated by a handle or lever 130 secured to the shaft 35a of the rotor. In place of such mechanism, another handle or lever 131 is provided for rotating the second piston 37 so as to advance the same through a mechanism detailed hereinafter. As shown in FIG. 21, an end cover 31a of the valve case 31 rotatably supports a shaft 132 to which the lever 131 is secured. The second piston 37 is slidably but not rotatably mounted on this shaft 132 by means of a splined connection 133 so that the piston 37 may be rotated through the shaft 132 by revolving the lever 131. To the periphery of the second piston 37 is formed a cam groove 134 into which a cam follower or pin 135 secured to the valve case 31 is inserted at the free end of the pin. As shown in FIG. 22, the cam groove 134 is gradually sloped toward the rearward from one end 134a, at which the pin 134 is positioned when the piston 37 takes the most retreated position, to the other end 134b at which the pin 134 is positioned when the piston 37 takes the most advanced position. The second piston 37 is thus advanved, when it is rotated toward one direction by the lever 131, and is retreated when it is rotated toward the other direction by the lever 131. At the most advanced position of the second piston 37, the drain passage 42 is blocked by such piston 37, as is the case of each of the control valves 26A to 26F. Between the valve case 31 and each of the levers 130 and 131 are provided detent means 138 and 139, respectively. The rear end of the compression spring 38 is received by the second piston 37 through a ring 137 fixed in position at within the piston 37. The other parts of the valve 26G shown in FIGS. 20 to 23 are constructed similarly to the ones of the valve 26A shown in FIGS. 2 to 8.

Figure 23:
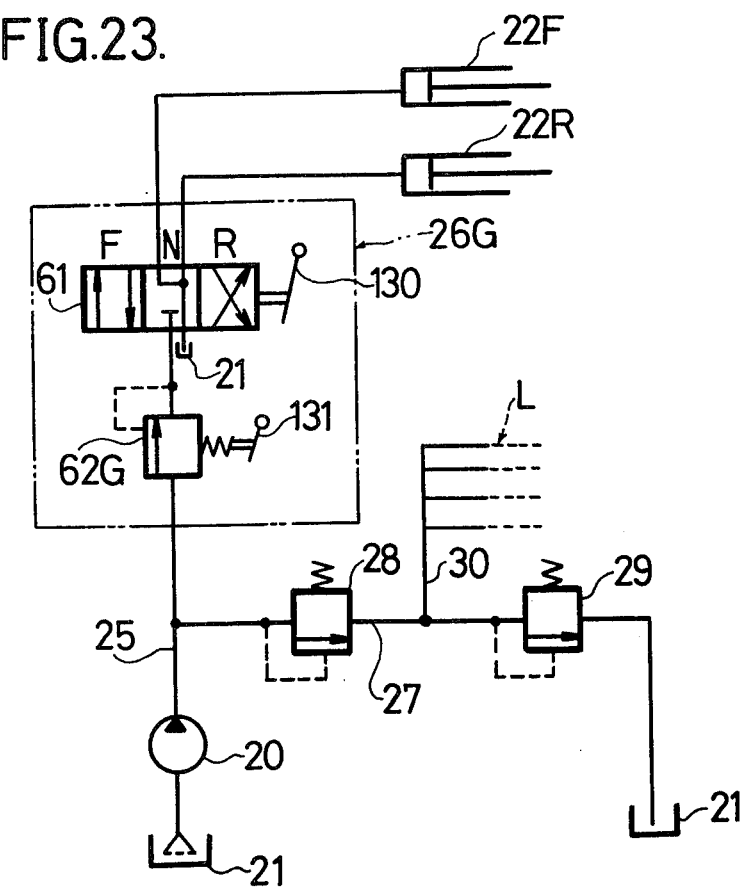
FIG. 23 is a schematic illustration similar to FIG. 1 but showing a use of the control valve means shown in FIGS. 20 to 22.

Needless to say, this control valve 26G operates similarly to each of the mentioned valves 26A to 26D. Control of the force of pressure caused by the compression spring 38 independently from the control of the position of the rotor 35 will allow an optional and fine control of fluid pressure applied to a fluid operated means. The fluid supply system in which the control valve 26G is employed in place of the valve 26 shown in FIG. 1 may be illustrated schematically as shown in FIG. 23 in which the valve mechanism for reducing fluid pressure is designated by 62G. It is preferred, although not shown in the drawings, that the levers 130 and 131 shown in FIGS. 20 and 21 are connected by a releasable connecting means so that the second piston 37 may also be advanced in response to the rotation of the rotor 35, that makes manual operation or change easy.

Although the control valve means according to the present invention has been detailed in conjunction with a particular use, namely in conjunction with a use in a fluid supply system for a fluid operated forward direction clutch 22F and a fluid operated backward direction clutch 22R, the control valve means according to the present invention may be used for controlling or varying fluid flow direction and fluid pressure of fluid for operating various fluid operated means which are employed in fishing boats, tooling machines, earth-working machines, vehicles and the like. The construction of the control valve means is, of course, altered or modified in accordance with a purpose of using such valve means within the scope of the present invention.

Figure 24:
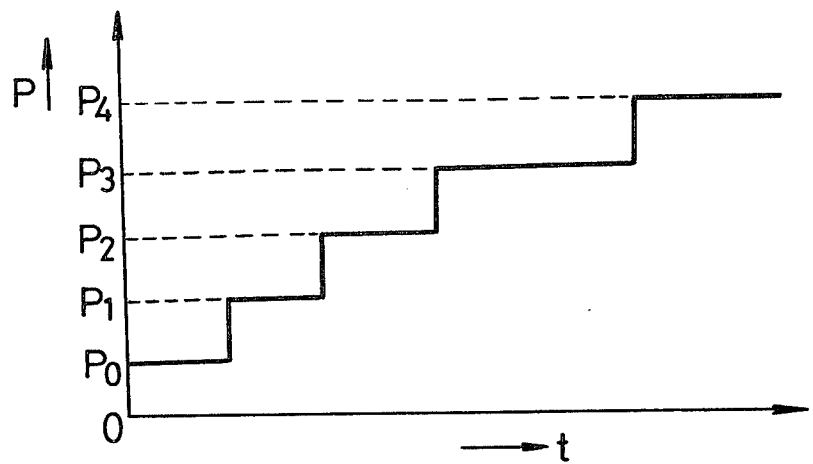
FIG. 24 is a schematic illustration showing another use of the control valve means according to the present invention.

Another purpose of the use of the control valve means according to the present invention is schematically illustrated in FIG. 24. This is an example of the use of such control valve means that fluid pressure applied to a fluid operated means is varied or controlled in a stepwise manner. At the beginning, a low pressure $P_o$ is applied to the fluid operated means, and then such pressure is stepwisely raised to higher pressure $P_1$, $P_2$, $P_3$ and $P_4$. This is achieved by advancing the second piston 37 intermittently by a small distance. In this case, it is preferred that detent means such as the means 138 and 139 is fashioned such that it restrains temporarily the handling means for advancing the second piston 37 through the rotor 35 or independently at each of the positions corresponding to such stepwise pressure.

Figure 25:
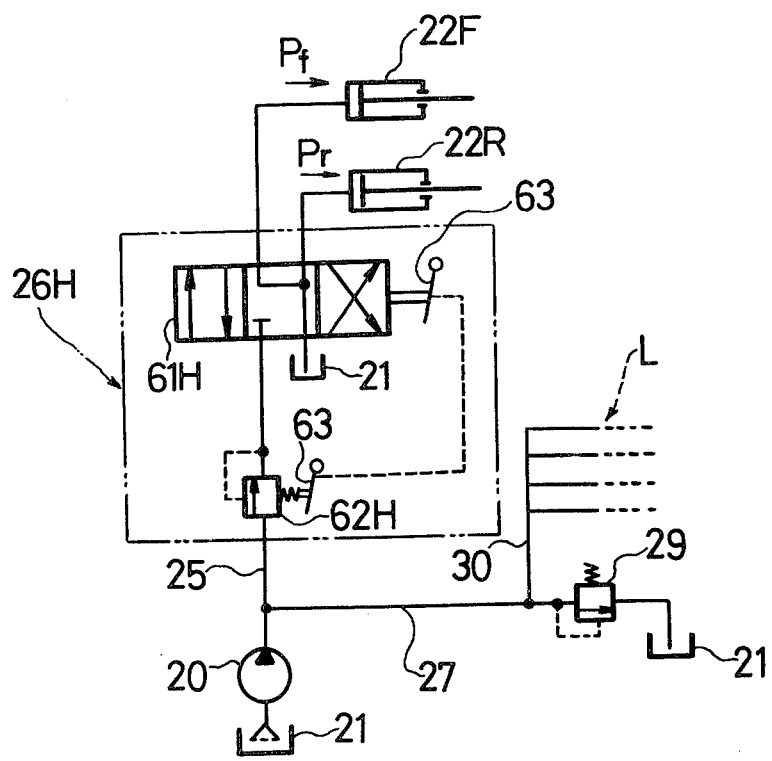
FIG. 25 is a schematic illustratin of a fluid supply system similar to FIG. 1 but showing a use of a further embodiment of the control valve means according to the present invention.

Further, when a compression spring having a large spring constant is employed as the mentioned compression spring 38 between the first and second pistons 36 and 37 and the control valve means is fashioned such that the mentioned fluid drain passage 42 for communicating the second fluid chamber 40 to the fluid drain port 34 is not blocked by the second piston 37 even at the most advanced position of such piston 37, a relief valve for establishing a normal fluid pressure for applying a fluid operated means such as the mentioned relief valve 28 (FIG. 1) may be omitted because such normal fluid pressure of a large value may also be caused in the control valve means itself according to the present invention due to the employment of such compression spring having a large spring constant. The fluid supply system which is similar to the one shown in FIG. 9 but in which such control valve means 26H establishing such normal pressure of, for example, 10 to 15 kg/cm² is employed may be illustrated schematically as shown in FIG. 25 in which the change-over valve mechanism and pressure-reducing valve mechanism are designated by numerals 61H and 62H, respectively. Fluid pressure applied to each of the fluid operated means 22F and 22R may be controlled to a pressure lower than such normal pressure by controlling the distance of advance of the second piston in this case, too. Further, in the system shown in FIG. 25, the highest or normal fluid pressure $P_r$ applied to one fluid operated means 22R may be made lower than the highest or normal fluid pressure $P_f$ applied to the other fluid operated means 22F by, for example, providing means which limits the advance of the second piston 37 to a smaller distance.

Furthermore, the number of the outlet ports 33 to be connected to fluid operated means is, of course, varied in accordance with the number of fluid operated means. The shape and the like of the members in the control valves are varied correspondingly.

The present invention is thus not limited to the particular embodiments shown.

What is claimed is:

1. A control valve means comprising a valve case having an inlet port which is to be connected to a fluid pump, at least one outlet port which is to be connected to a fluid operated means, and a fluid drain port which is to be connected to a fluid tank; a rotor rotatably arranged in the valve case which rotor provides fluid passages for communicating said outlet port selectively to said fluid drain port at a neutral position thereof or to said inlet port at an operation position thereof; and a handling means for rotating said rotor selectively to one of said positions, characterized in that said rotor is provided with a hollow space having an opened rear end in which space are slidably inserted a first piston defining a first fluid chamber in the hollow space before the said piston and a second piston defining a second fluid chamber in the hollow space between said pistons, said first piston further defining a fluid passage for communicating said inlet port to said outlet port within said hollow space outside the first piston, and said first fluid chamber being communicated to said outlet port through a fluid passage formed between the rotor and first piston at said operation position of the rotor, said first and second fluid chambers being in communication to each other through a throttled fluid passage formed in the first piston, and said second fluid chamber being communicated to said fluid drain port through a fluid drain passage formed in the rotor; a compression spring provided between said first and second pistons for biasing the pistons to move apart from each other, said spring being compressed with an advance of the second piston so that force applied to the first piston by such spring is enlarged; said first piston being provided at the periphery thereof with a blocking portion which blocks said fluid passage for communicating the inlet port to the outlet port at said operation position of the rotor when the first piston has been retreated by a predetermined distance; and means for advancing said second piston by a selected distance.

2. The control valve means as claimed in claim 1, characterized in that said fluid drain pasage for communicating the second fluid chamber to the fluid drain port is located along the axial direction of the valve such that the fluid drain passage is blocked by said second piston when the second piston has been advanced by a predetermined distance.

3. The control valve means as claimed in claim 1, characterized in that said second piston is connected to said handling means so that the second piston is advanced by the handling means as said rotor is rotated from said neutral position toward said operation position.

4. The control valve means as claimed in claim 3, characterized in that said second piston is slidably but not rotatably connected to said rotor and including cam means for moving said second piston to slide with the rotation of the second piston.

5. The control valve means as claimed in claim 4, characterized in that said cam means is formed such that even the full rotation of the rotor toward the operation position does not cause the blocking of said fluid drain passage by the second piston; said cam means is slidably but not rotatably arranged within the valve case; another fluid chamber being formed within the valve case behind the cam means; and said rotor and valve case are provided with fluid passages for communicating said another fluid chamber to said fluid drain port at the neutral position of the rotor and throttled fluid passages for communicating said inlet port to said another fluid chamber when the rotor has been rotated fully toward said operation position.

6. The control valve means as claimed in claim 1, characterized in that said second piston is slidably but not rotatably connected to said rotor; a further fluid chamber is formed within the valve case behind said second piston; said rotor and valve case are provided with throttled fluid passages for communicating said inlet port to said further fluid chamber at least at said operation position of the rotor; and the valve case is further provided with a fluid passage for communicating said further fluid chamber to said fluid drain port which passage is once blocked by the second piston, when the rotor is rotated from the neutral position toward the operation position thereof, due to a rotation of such second piston and whih is then reopened when the second piston has been advanced by a distance corresponding to the rotated angle of the rotor.

7. The control valve means as claimed in claim 6, characterized in that said fluid passage for communicating said further fluid chamber to said fluid drain port is formed such that the said fluid passage is blocked by the second piston when the rotor has been rotated fully to the operation position thereof.

8. the control valve means as claimed in claim 1, characterized in that means is provided which moves said second piston along the axial direction of the valve in response to the output of said fluid operated means so that, the smaller said output is, the more forward position the second piston takes.

9. The control valve means as claimed in claim 8, characterized in that a control piston engaging said second piston is slidably arranged within the valve case behind the second piston; another fluid chamber is formed within the valve case behind said control piston; and the valve case is formed with another port opened to the said another fluid chamber for supplying pressure fluid to and draining fluid from the said another fluid chamber in response to the output of said fluid operated means.

10. The control valve means as claimed in claim 1, characterized in that said means for advancing the second piston is formed into a handling means such that it moves the second piston to move along the axial direction of the valve independently from the rotation of the rotor.

11. The control valve means as claimed in claim 1, characterized in that said compression spring is received at the rear end thereof by said second piston through a receiving means which is supported by the second piston so that the position of the receiving means may be varied along the axial direction of the second piston.

* * * * *